(12) United States Patent
Birch et al.

(10) Patent No.: US 6,656,398 B2
(45) Date of Patent: Dec. 2, 2003

(54) PROCESS OF MAKING A PATTERN IN A FILM

(75) Inventors: William R. Birch, Samois sur Seine (FR); Alain R. E. Carre, Le Chatelet-en-Brie (FR); Paul D. Frayer, Painted Post, NY (US); Kenjiro Hasui, Shizuoka (JP)

(73) Assignee: Corning Incorporated, Corning, NY (US)

( * ) Notice: Subject to any disclaimer, the term of this patent is extended or adjusted under 35 U.S.C. 154(b) by 294 days.

(21) Appl. No.: 09/884,641

(22) Filed: Jun. 19, 2001

(65) Prior Publication Data

US 2002/0190416 A1 Dec. 19, 2002

(51) Int. Cl.$^7$ ............................................. B29C 33/64
(52) U.S. Cl. ...................... 264/85; 106/38.22; 264/293; 264/338
(58) Field of Search ......................... 264/85, 293, 338; 106/38.22

(56) References Cited

U.S. PATENT DOCUMENTS 5,772,905 A    6/1998  Chou ........................... 216/44
5,861,113 A    1/1999  Choquette et al. ......... 264/1.24

OTHER PUBLICATIONS

H–C. Scheer, Problems of the nanoimprinting technique for nanometer scale pattern definition, J. Vac. Sci. Technol. B 16(6), Nov./Dec. 1998, pp. 3917–3921.
Stephen Chou et al., Nanoimprint Lithography, J. Vac. Sci. Technol. B 14(6), Nov./Dec. 1996, pp. 4129–4133.
Abstract of JP 09099441 A (Published Apr. 15, 1997).

*Primary Examiner*—Leo B. Tentoni
(74) *Attorney, Agent, or Firm*—Adenike A. Adewuya; Timothy M. Schaeberle

(57) ABSTRACT

A method for forming a pattern in a film carried on a substrate includes depositing a layer of alkyl silane on a surface of a mold having a pattern, bringing the mold in contact with the film on the substrate and pressing the mold into the film so as to emboss the pattern on the mold in the film, wherein the film comprises a thermoplastic polymer, and removing the mold from the film.

11 Claims, 2 Drawing Sheets

PROCESS OF MAKING A PATTERN IN A FILM

BACKGROUND OF INVENTION

1. Field of the Invention

The invention relates generally to embossing technology. In particular, the invention relates to a releasing agent for embossing mold with high pattern density.

2. Background Art

U.S. Pat. No. 5,772,905 issued to Chou discloses a hot embossing technique, called nanoimprint lithography, for forming submicron patterns on a thin film carried on a substrate. The embossing technique involves forming a submicron pattern on a substrate by such methods as electron beam lithography (EBL) and subsequent etching processes so that the substrate can act as a mold. The mold with the submicron pattern is brought into contact with a thermoplastic polymer, e.g., polymethyl methacrylate (PMMA), carried on a surface of a substrate so that the pattern on the mold can be embossed on the polymer. During the embossing step, the polymer, the substrate, and the mold are heated to allow sufficient softening of the polymer relative to the mold. The mold is then urged at a molding pressure into the polymer so as to transfer the pattern on the mold to the polymer. After a period of time, the entire assembly is cooled below the glass transition temperature of the polymer, allowing the pattern transferred to the polymer to harden. Then, the mold is separated from the polymer.

Sticking when separating the mold from the polymer is a concern, especially if the mold has a high surface area. The main causes of sticking are chemical affinity and physical property at the interface between the mold and the polymer. Evolution of stresses between the polymer and mold during embossing also contribute to sticking. See, for example, H. Scheer et al., "Problems of the Nanoimprinting Technique for Nanometer Scale Pattern Definition," Journal of Vacuum Science Technology, B 16 (1998), pp. 3917. In order to suppress such stress evolution, the polymer should have smaller thermal expansion and smaller pressure shrinkage at the embossing temperature and pressure ranges. Stress evolution may also be suppressed by changing the thermal cycle for the embossing process. However, finding the optimum cycle for the embossing process would require many experiments.

There are two general approaches for avoiding sticking between the mold and the polymer. The first approach involves modification of the polymer surface using an additive in the polymer. See, for example, S. Y. Chou et al., "Nanoimprint Lithography," Journal of Vacuum Science Technology, B 14 (1996), pp. 4129–4133. Such additive is called an internal releasing agent. However, the internal releasing agent may influence embossing condition as well as subsequent pattern transfer process. One of the examples of such concerns is cited in Japanese Patent PAJ-09099441 by Amatami et al., entitled "Internal release agent for molding plastic lens and production of plastic lens," issued Apr. 15, 1997. In this document, polymer is molded by a glass mold to make a lens. Amatami et al. reported that the internal releasing agents caused color change, haze generation, and so forth. The haze appearance is due to light scattering by surface roughening. Haze is a big concern in fine patterning because the surface roughness would be equal to or larger than the patterned feature. Therefore, haze must be avoided in fine patterning.

The second approach for avoiding sticking between the mold and polymer involves modifying the mold surface. The surface of the mold can be modified by applying a releasing agent on it or by texturing it. However, surface texturing is not suited for embossing fine patterns because the texture features would be large in comparison to the pattern and would be transferred to the polymer. Thus what is needed is an effective releasing agent for embossing mold with high pattern density.

U.S. Pat. No. 5,861,113 issued to Choquette et al. discloses using fluorinated silane as a release layer against a curable plastic material. The fluorinated silane contains at least one alkoxy or halide group which is bonded directly to the Si atom of the silane and capable of reacting with oxide groups on a substrate or metal layer on the substrate. The fluorinated silane also contains at least one fluorinated alkyl group bonded to the Si atom of the silane. Examples of fluorinated silanes include tridecafluoro-1,1,2,2-tetrahydrooctyl-1-trichlorosilane from Petrarch Systems, Bristol, Penn. A thin layer of the fluorinated silane is formed on a grating pattern on a surface of a substrate using vapor deposition techniques. The silane groups of the fluorinated silane react with oxide groups on the substrate surface to provide a relatively strong covalent bond of the release layer to the substrate. Embossed gratings are fabricated on a waveguide surface by placing a small drop of UV curable epoxy on the waveguide surface and pressing the epoxy drop onto the silanized grating pattern. The epoxy is then cured, and the waveguide surface is removed from the silanized grating pattern, leaving an embossed grating on the waveguide surface.

SUMMARY OF INVENTION

In one aspect, the invention relates to a releasing agent for embossing a film carried on a surface of a substrate with a mold having a pattern which comprises an alkyl silane. In one embodiment, the alkyl silane forms a self-assembled monolayer on a surface of the mold.

In another aspect, the invention relates to a method for forming a pattern in a film carried on a substrate which comprises depositing a layer of alkyl silane on a surface of the mold having a pattern, bringing the method in contact with the film on the substrate and pressing the mold into the film so as to emboss the pattern on the mold in the film, and removing the mold from the film. In one embodiment, a thickness of the alkyl silane layer is molecular monolayer.

Other aspects and advantages of the invention will be apparent from the following description and the appended claims.

DETAILED DESCRIPTION

Embodiments of the invention provide a releasing agent for embossing mold with high pattern density, e.g., a mold having submicron grid pattern, and a method for embossing using the releasing agent. It should be clear, however, that the releasing agent of the present invention is not limited to embossing mold with high pattern density. In general, the releasing agent comprises an alkyl silane. The alkyl silane contains at least one alkyl group bonded to the Si atom of the silane. An alkyl group is a fragment of an alkane structure that results from the removal of a hydrogen atom from an alkane. The silane may have more than one Si atom.

Preferably, the alkyl silane forms a self-assembled monolayer (SAM) on the surface of the mold. Examples of alkyl silanes which form SAM include, but are not limited to, octadecyltriethoxysilane (OTE) and octadecyltrichlorosilane (OTS). SAMs are the most widely studied and best developed examples of non-biological, self-assembling systems. SAMs form spontaneously by chemisorption and self-organization of functionalized, long-chain organic molecules onto the surfaces of appropriate substrates. Due to the chemisorption, SAM chemically bonds to the surface of the substrate. The thickness of the SAM layer is precisely controlled with high uniformity. The SAM layer can be formed by spontaneous generation of the alkyl silane on the mold in a vaporized atmosphere. Alternatively, a solution of alkyl silane molecules can be applied on the mold to form a molecular monolayer on the surface of the mold.

Figure 1:
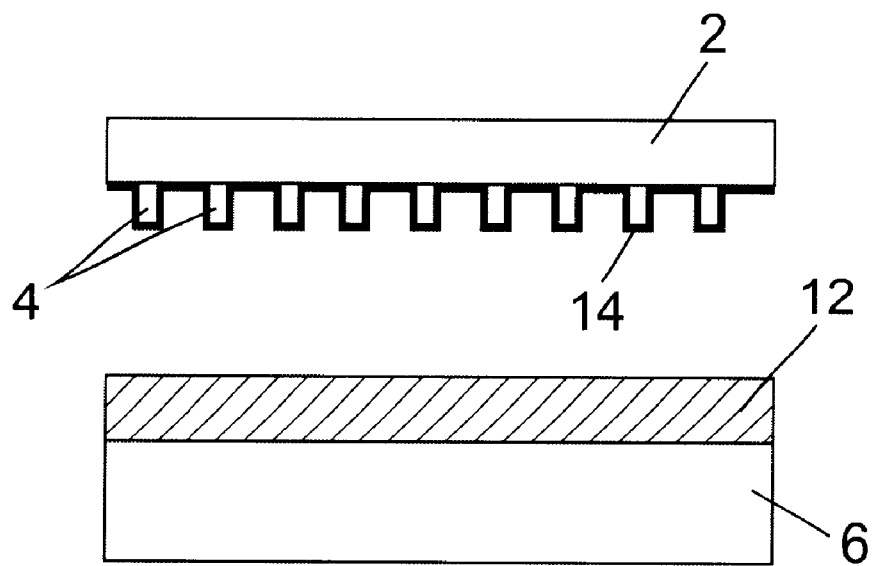
FIG. 1 illustrates the heating step of a process for forming a grid pattern on a substrate in accordance with one embodiment of the invention.
Figure 2:
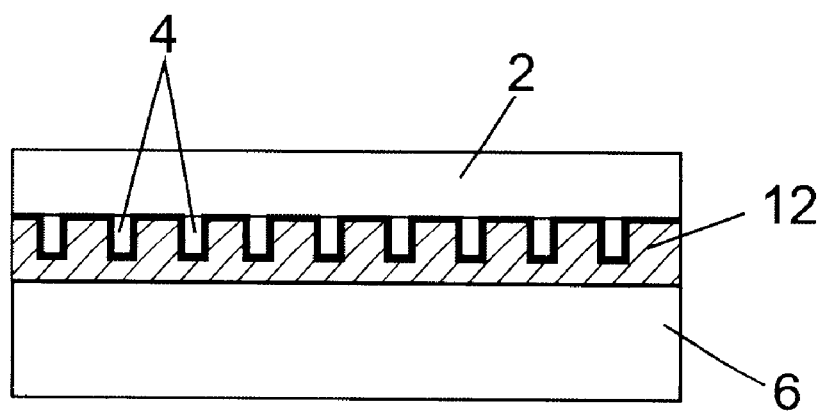
FIG. 2 shows an embossing mold and resist-coated substrate compressed together.
Figure 3:
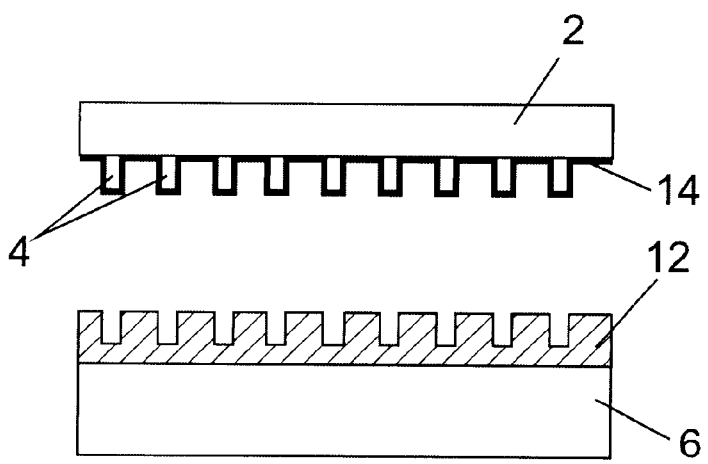
FIG. 3 shows the embossing mold separated from the resist-coated substrate.

Various embodiments of the invention will now be described with reference to the accompanying figures. FIGS. 1–3 illustrate a process for forming a grid pattern on a substrate. Referring to FIG. 1, the process starts with fabrication of a mold 2 having a grid pattern. The mold 2 is fabricated by such methods as EBL and subsequent etching processes. In the illustrated embodiment, the grid pattern is an array of parallel grid elements 4 spaced apart a predetermined distance and having a predetermined width and depth. A resist film 12 is applied on a substrate 6. In one embodiment, the resist film 12 comprises a thermoplastic polymer, e.g., PMMA. To avoid sticking, a layer of releasing agent 14 is applied on the surface of the mold 2. The releasing agent 14 is preferably incompatible with the thermoplastic polymer and forms a strong bond with the surface of the mold 2 and/or the surfaces of the grid elements 4. The mold 2 and the resist-coated substrate 6 are brought into contact and heated to a temperature preferably above the glass transition temperature of the thermoplastic polymer so that the thermoplastic polymer is softened relative to the mold. Preferably, the releasing agent 14 is stable at the embossing temperature which would preferably be above the glass transition temperature of the thermoplastic polymer.

As shown in FIG. 2, the mold 2 and resist-coated substrate 6 are compressed together for a period of time in order to allow the grid elements 4 on the mold 2 to sufficiently penetrate the resist film 12. Later, the mold 2 and the resist-coated substrate 6 are cooled under constant pressure. After the mold 2 and resist-coated substrate 6 are sufficiently cooled to harden the resist film 12, the mold 2 is separated from the resist-coated substrate 6, as shown in FIG. 3. The result of the process is duplication of the grid pattern in the resist film 12.

The following examples evaluate the effectiveness of OTE-SAM as a releasing agent for the embossing mold (2 in FIGS. 1–3). These examples are not intended to limit the scope of the invention as otherwise described herein.

EXAMPLE 1

In this example, the effectiveness of OTE-SAM as a releasing agent was evaluated. OTE is incompatible with PMMA. OTE-SAM was applied to a mold having a submicron grid pattern by the liquid phase deposition, using for example the protocol described by J. Peanasky, H. M Schneider and S. Granick, in Langmuir, Vol. 11, P. 953, 1995. This involved applying a solution of OTE molecules onto the mold surface. The solution application generated a SAM grated to the mold surface and had a thickness of 2 nm.

In order to confirm the releasing property of OTE-SAM, a comparative test was made using two planar silicon molds. One of the planar silicon molds was bare, and the other planar silicon mold was coated with OTE-SAM. The water contact angle of the OTE-SAM on the planar mold was 105°. The OTE-SAM-coated mold and the bare mold were heated to 140° C. Two PMMA-coated substrates were heated to 120° C. and brought into contact with the OTE-SAM-coated mold and the bare mold, respectively. A pressure of 31 MPa was then applied to the molds and PMMA-coated substrates for one minute. Then the molds and PMMA-coated substrates were cooled for 4.5 minutes. At this time, the temperature of the OTE-SAM-coated mold was 58° C., and the temperature of the PMMA-coated substrate in contact with this mold was 64° C. The temperatures of the bare mold and the PMMA substrate in contact with the bare mold were both 68° C. During separation, the OTE-SAM mold did not stick to the PMMA, whereas the bare mold stuck to the PMMA.

EXAMPLE 2

In this example, the effectiveness of OTE-SAM as a releasing agent for a mold having high pattern density was evaluated. The OTE-SAM was applied to a mold having a submicron grid pattern by the liquid phase deposition. The thickness of the OTE-SAM layer on the mold surface was 2 nm. The water contact angle of OTE-SAM on the submicron grid mold was 142°. A 0.66 µm thick PMMA was embossed by this mold for 1 minute at a temperature of 110° C. for both the mold and the substrate and a pressure of 67 MPa. The mold and substrate were cooled for 4 minutes at 67 MPa. The mold did not stick to the PMMA, indicating that OTE-SAM is effective as a releasing agent against PMMA. OTE-SAM demonstrated higher temperature embossing where uniform embossed area was obtained. The period, line width, depth, and aspect ratio of the patterned PMMA were 0.57 µm, 0.25 µm, 0.69 µm, and 2.8, respectively.

Figure 4:
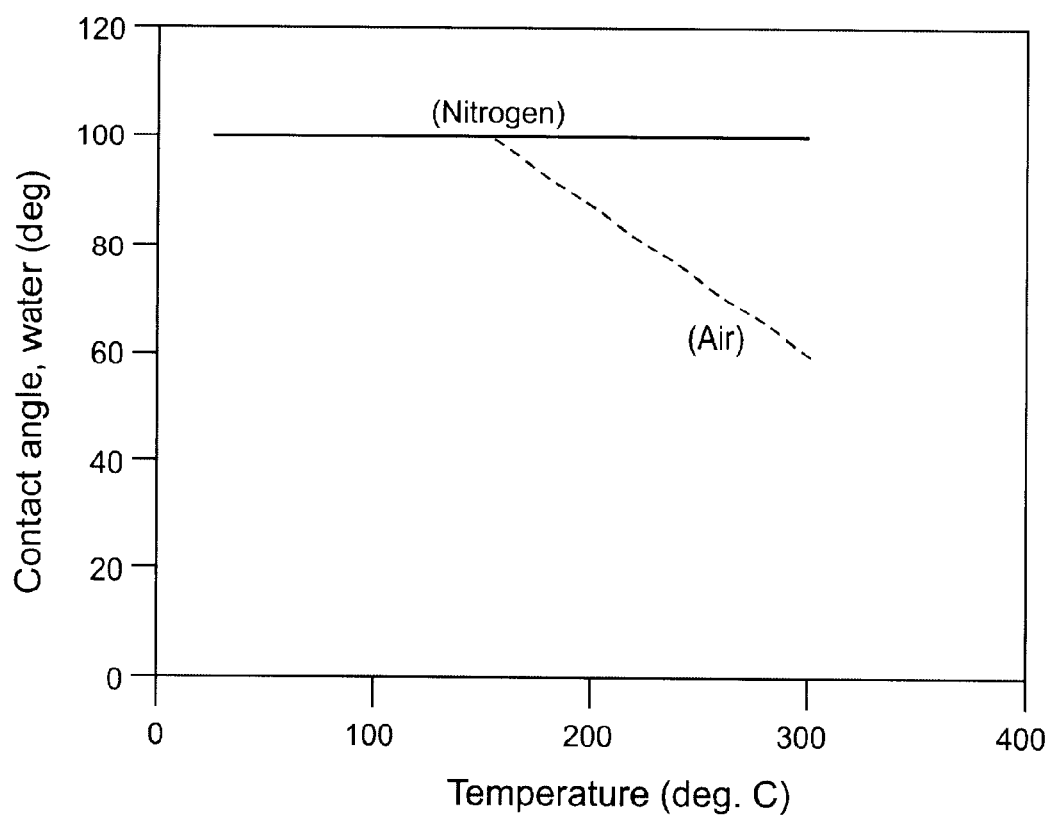
FIG. 4 is a graph showing contact angle vs. temperature for OTE-SAM-coated substrate annealed in air and nitrogen atmosphere.

Repeated embossment with the same mold indicated that the releasing property of OTE-SAM gradually degrades when the embossing process takes place in air. FIG. 4 shows the water contact angles on OTE-SAM coated surfaces as a function of anneal temperature. These samples were annealed in either nitrogen or air for 30 minutes. For the sample annealed in nitrogen, the contact angle is constant at the tested temperatures, indicating the presence of OTE-SAM even after annealing. On the other hand, the contact angle in samples annealed in air decreased at the tested temperatures, indicating absence of OTE-SAM. Therefore, embossing in nitrogen atmosphere, or other inert atmosphere, is considered to be effective in prolonging the life of the OTE-SAM layer.

Other alkyl silanes besides OTE may form SAM on the mold surface. For example, silanes with shorter alkyl chain with 16 (hexadecyltrichlorosilane) or 12 (dodecyltrichlorosilane) carbons in the alkyl chain may also provide good release properties to the mold. In general, the shorter alkyl chain can have carbon atoms ranging from 12 to 18. OTS also easily forms a SAM coating and is incompatible with PMMA. OTS is commonly used to form lipidophilic surface coatings and is cheaper than, for example, hexadecyltrichlorosilane or dodecyltrichlorosilane.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for forming a pattern in a film carried on a substrate, comprising:

depositing a layer of alkyl silane on a surface of a mold having a pattern;

bringing the mold in contact with the film on the substrate and pressing the mold into the film so as to emboss the pattern on the mold in the film, wherein the film comprises a thermoplastic polymer; and removing the mold from the film.

2. The method of claim 1, wherein a thickness of the alkyl silane layer is molecular monolayer.

3. The method of claim 1, further including heating the film to an embossing temperature to allow sufficient softening of the thermoplastic polymer relative to the mold prior to pressing the mold into the film.

4. The method of claim 1, wherein removing the mold from the film further includes cooling the mold and film below the glass transition temperature of the thermoplastic polymer.

5. The method of claim 3, wherein the alkyl silane is thermally stable at the embossing temperature.

6. The method of claim 3, wherein the thermoplastic polymer is polymethyl methacrylate.

7. The method of claim 1, wherein the alkyl silane comprises octadecyltriethoxysilane.

8. The method of claim 1, wherein the alkyl silane comprises octadecyltrichlorosilane.

9. The method of claim 1, wherein the alkyl silane comprises an alkyl group having carbon atoms ranging from 12 to 18.

10. The method of claim 1, wherein the pattern is embossed in the film in an inert atmosphere.

11. The method of claim 1, wherein the pattern is embossed in the film in a nitrogen atmosphere.

* * * * *